(12) United States Patent
Burgard et al.

(10) Patent No.: US 11,246,273 B2
(45) Date of Patent: Feb. 15, 2022

(54) SYSTEM, METHOD AND APPARATUS FOR INTEGRATION OF FIELD, CROP AND IRRIGATION EQUIPMENT DATA FOR IRRIGATION MANAGEMENT

(71) Applicant: Valmont Industries, Inc., Omaha, NE (US)

(72) Inventors: Daniel J. Burgard, Spokane Valley, WA (US); Jacob L. LaRue, Owasso, OK (US); Hiran Medeiros Moreira, Uberaba-MG (BR)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 17/095,885

(22) Filed: Nov. 12, 2020

(65) Prior Publication Data

US 2021/0169025 A1    Jun. 10, 2021

Related U.S. Application Data (60) Provisional application No. 62/945,268, filed on Dec. 9, 2019.

(51) Int. Cl.
| | | |
|---|---|---|
| *A01G 25/16* | (2006.01) | |
| *G06T 7/00* | (2017.01) | |
| *G05B 19/042* | (2006.01) | |
| *A01G 25/09* | (2006.01) | |

(52) U.S. Cl.
CPC ........... *A01G 25/167* (2013.01); *A01G 25/09* (2013.01); *A01G 25/165* (2013.01); *G05B 19/042* (2013.01); *G06T 7/0012* (2013.01); *G05B 2219/2625* (2013.01); *G06T 2207/30188* (2013.01)

(58) Field of Classification Search
CPC .... A01G 25/167; A01G 25/09; A01G 25/165; A01G 25/16; A01G 25/092; G06T 7/0012; G06T 2207/30188; G05B 19/042; G05B 2219/2625
See application file for complete search history.

(56) References Cited

U.S. PATENT DOCUMENTS

| | | |
|---|---|---|
| 5,884,224 A | 3/1999 | McNabb et al. |
| 8,924,030 B2 | 12/2014 | Wendte et al. |
| 8,989,907 B2 | 3/2015 | Schmidt et al. |

(Continued)

FOREIGN PATENT DOCUMENTS

| | | | | |
|---|---|---|---|---|
| CN | 107077650 A | * | 8/2017 | ............. G06Q 10/06 |
| DE | 102015122148 A1 | | 6/2017 | |

(Continued)

*Primary Examiner* — Chad G Erdman
(74) *Attorney, Agent, or Firm* — Milligan PC LLO (57) ABSTRACT

The present invention provides a system, method and apparatus for providing an irrigation scheduling module including a graphical user interface for providing irrigation scheduling data for a given field location. According to a preferred embodiment, the irrigation scheduling module is configured to calculate and display an irrigation recommendation for a given set of forecast data. According to a further preferred embodiment, the irrigation recommendation includes a representative shape in the form of a circle which changes from a full circle to a crescent-shaped percentage of the full circle based on the field moisture status.

12 Claims, 9 Drawing Sheets

(56) References Cited

U.S. PATENT DOCUMENTS

| | | |
|---|---|---|
| 9,060,473 B2 | 6/2015 | Lindores |
| 9,113,591 B2 | 8/2015 | Shivak |
| 9,265,187 B2 | 2/2016 | Cavender-Bares et al. |
| 9,357,760 B2 | 6/2016 | Anderson |
| 9,565,847 B2 | 2/2017 | Ballu |
| 9,894,829 B2 | 2/2018 | Shivak |
| 10,028,426 B2 | 7/2018 | Schildroth et al. |
| 2008/0046130 A1 | 2/2008 | Faivre et al. |
| 2011/0073026 A1 | 3/2011 | Martin et al. |
| 2012/0150357 A1 | 6/2012 | Kline, III et al. |
| 2015/0027044 A1 | 1/2015 | Redden |
| 2016/0198694 A1 | 7/2016 | Ballu |
| 2016/0302351 A1 | 10/2016 | Schildroth et al. |
| 2018/0129175 A1* | 5/2018 | Jennings ............ G06K 9/00657 |
| 2020/0160459 A1* | 5/2020 | Coolidge ............ A01C 21/007 |
| 2021/0112705 A1* | 4/2021 | Coolidge ............ A01C 21/005 |

FOREIGN PATENT DOCUMENTS

| | | |
|---|---|---|
| WO | 2012037267 A1 | 3/2012 |
| WO | 2017219072 A1 | 12/2017 |

\* cited by examiner

SYSTEM, METHOD AND APPARATUS FOR INTEGRATION OF FIELD, CROP AND IRRIGATION EQUIPMENT DATA FOR IRRIGATION MANAGEMENT

RELATED APPLICATIONS

The present application claims priority to U.S. patent application Ser. No. 62/945,268 filed Dec. 9, 2019.

BACKGROUND AND FIELD OF THE PRESENT INVENTION

Field of the Present Invention

The present invention relates generally to an irrigation management system. More particularly, the present invention relates to a system, method and apparatus for providing full integration of field, crop and irrigation equipment data for irrigation management.

Background of the Invention

Modern field irrigation machines are combinations of drive systems and sprinkler systems. Generally, these systems are divided into two types depending on the type of travel they are designed to execute: center pivot and/or linear.

Regardless of being center pivot or linear, common irrigation machines most often include an overhead sprinkler irrigation system consisting of several segments of pipe (usually galvanized steel or aluminum) joined together and supported by trusses, mounted on wheeled towers with sprinklers positioned along its length. These machines move in a circular pattern (if center pivot) or linear and are fed with water from an outside source (i.e. a well or water line). The essential function of an irrigation machine is to apply an applicant (i.e. water or other solution) to a given location.

Traditionally, growers will map a field using field scouting, satellite, unmanned aerial vehicle (UAV) and/or micro air vehicle (MAV) images. Additionally, deployed irrigation machines and active sensors provide continual streams of data. Each of these monitored factors impact crop yields. Independent of these factors, growers are also affected by the cost of the goods and services needed for crop production (e.g. water, electricity, fertilizer). These costs continually change along with weather data and commodity pricing. At present, these groups of information are not integrated or easily displayed. Instead, the management and analysis of this data can be very expensive and require three or more software platforms to view and analyze the data. Additionally, growers are required to spend increasing amounts of time to manually combine data and calculate field irrigation requirements.

In order to overcome the limitations of the prior art, a system is needed which can effectively integrate and display data from different sources. Further, a system is needed which can provide actionable data analysis for growers.

SUMMARY OF THE DISCLOSURE

To minimize the limitations found in the prior art, and to minimize other limitations that will be apparent upon the reading of the specifications, the present invention provides a system, method and apparatus for providing an irrigation scheduling module including a graphical user interface for providing irrigation scheduling data for a given field location.

According to a preferred embodiment, the irrigation scheduling module is configured to calculate and display an irrigation recommendation for a given set of forecast data. According to a further preferred embodiment, the irrigation scheduling display includes a representative shape in the form of a circle which changes from a full circle to a crescent-shaped percentage of the full circle based on the field moisture status.

DESCRIPTION OF THE PREFERRED EMBODIMENTS

Reference is now made in detail to the exemplary embodiments of the present invention, examples of which are illustrated in the accompanying drawings. Wherever possible, the same reference numbers will be used throughout the drawings to refer to the same or like parts. The descriptions, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense (i.e., meaning "having the potential to"), rather than the mandatory sense (i.e. meaning "must").

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic link library and/or other sequence of instructions designed for execution on a computer system. A data storage means, as defined herein, includes many different types of computer readable media that allow a computer to read data therefrom including volatile storage such a RAM, buffers, cache memory, and signals within network circuits.

Aspects of the systems and methods described herein may be implemented as functionality programmed into any of a variety of circuitry, including programmable logic devices (PLDs), microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Additionally, the functions of the disclosed embodiments may be implemented on one computer or shared/distributed among two or more computers in or across a network or a cloud.

Communications between computers implementing embodiments may be accomplished using any electronic, optical, radio frequency signals, or other suitable methods and tools of communication in compliance with known network protocols. For example, the present invention may include an RF module for receiving and transmitting electromagnetic waves, implementing the conversion between electromagnetic waves and electronic signals, and communicating with the communication network or other devices. The RF module may include a variety of existing circuit elements, which perform functions, such as antennas, RF transceivers, digital signal processors, encryption/decryption chips, the subscriber identity module (SIM) card, memory, etc. The RF module can communicate with a variety of networks such as the Internet, intranets, wireless network and communicate to other devices via wireless network.

Figure 1:
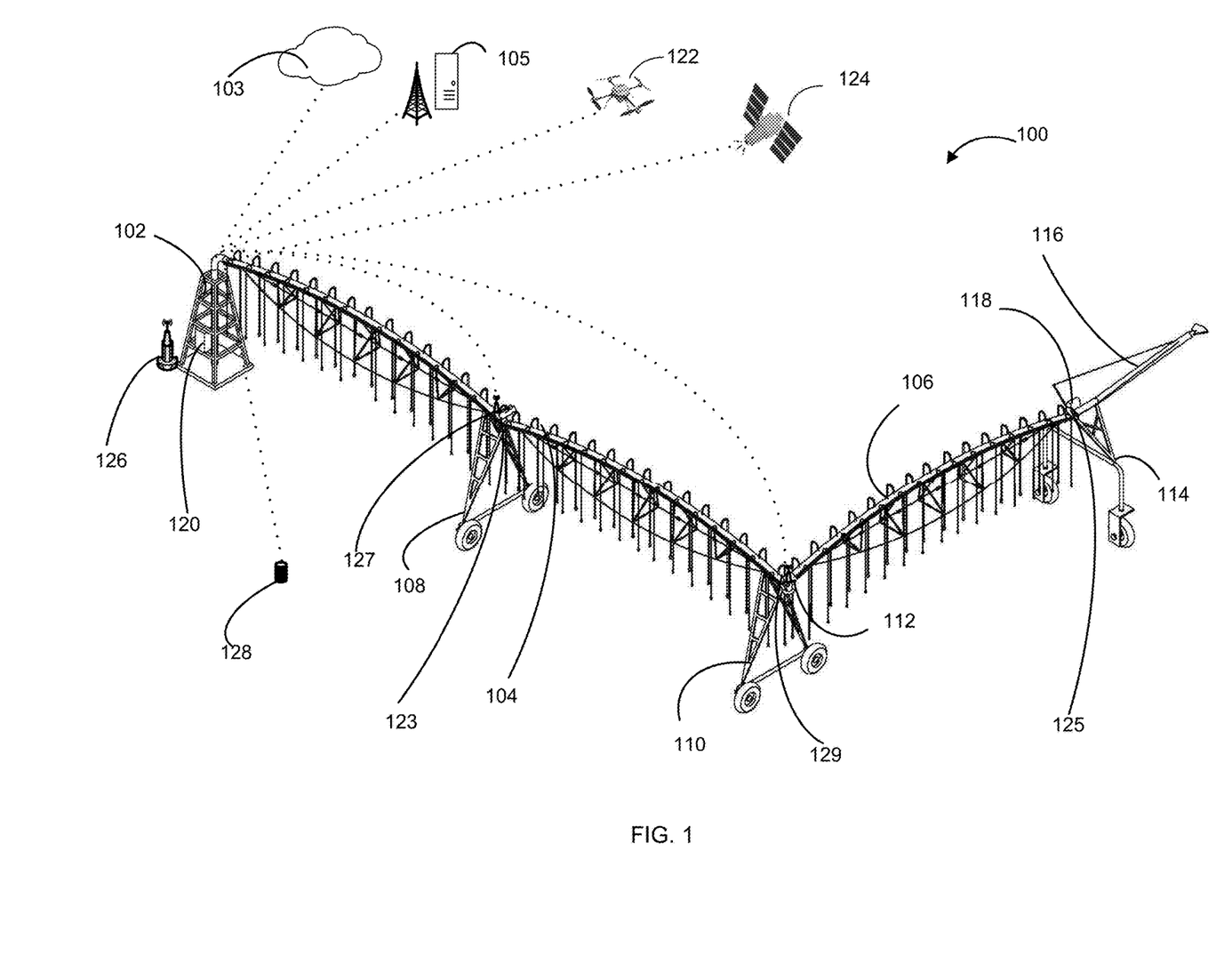
FIG. 1 shows an exemplary irrigation system in accordance with a first preferred embodiment of the present invention.

FIGS. 1-9 illustrate various configurations of irrigation systems which may be used with example implementations of the present invention. As should be understood, the irrigation systems shown in FIGS. 1-9 are exemplary systems onto which the features of the present invention may be integrated. Accordingly, FIGS. 1-9 are intended to be purely illustrative and any of a variety of systems (i.e. fixed systems as well as linear and center pivot self-propelled irrigation systems; stationary systems; corner systems) may be used with the present invention without limitation. For example, although FIG. 1 is shown as a center pivot irrigation system, the exemplary irrigation system 100 of the present invention may also be implemented as a linear irrigation system. The example irrigation system 100 is not intended to limit or define the scope of the present invention in any way.

With reference now to FIG. 1, an exemplary irrigation machine 100 of the present invention preferably may include a main span 104, a center pivot structure 102 and supporting drive towers 108, 110. The exemplary irrigation machine 100 may also include a corner span 106 attached at a connection point 112. The corner span 106 may be supported and moved by a steerable drive unit 114. The corner span 106 may include a boom 116 and an end gun (not shown) and/or other sprayers. Additionally, a position sensor 118 is preferably provided to provide positional and angular orientation data for the system as discussed further below. Further, a central control panel 120 is provided for enclosing on-board computer elements such as elements of the exemplary control device 121 discussed below. The control panel 120 may also be linked to a transceiver for transmitting and receiving data between system elements, device/internet clouds 103, remote servers 105 and/or the like. In accordance with a further aspect of the present invention, the control panel 120 may be further linked to a remote sensing element such as a sensor suite located on an unmanned aerial vehicle 122 (UAV) or manned aerial vehicle (MAV). The system is preferably further designed to receive, and process sensor data provided by satellite 124 and other high-altitude monitoring systems.

Additionally, the system may include and/or receive data from remote sensors 128 which may provide in-situ soil data (e.g. moisture content) and/or crop related data. The system may also include image sensors 123, 125 which preferably may include sensors to indirectly determine the moisture levels in a given area of soil and/or optics to allow for the detection of crop type, stage of grown, health, presence of disease, rate of growth and the like. The system may also include a weather station 126 or the like to measure weather features such as humidity, pressure, precipitation, solar radiation, temperature and the like. Additionally, the system may include wireless transceivers/routers 127, 129 for receiving and transmitting signals between system elements. Preferably, the data collected by the detectors and sensors of the present invention are connected to the span are forwarded to a main control panel 120 and control device 121. Alternatively, the received data may be collected and retransmitted to a remote server/cloud for processing and analysis.

Figure 2:
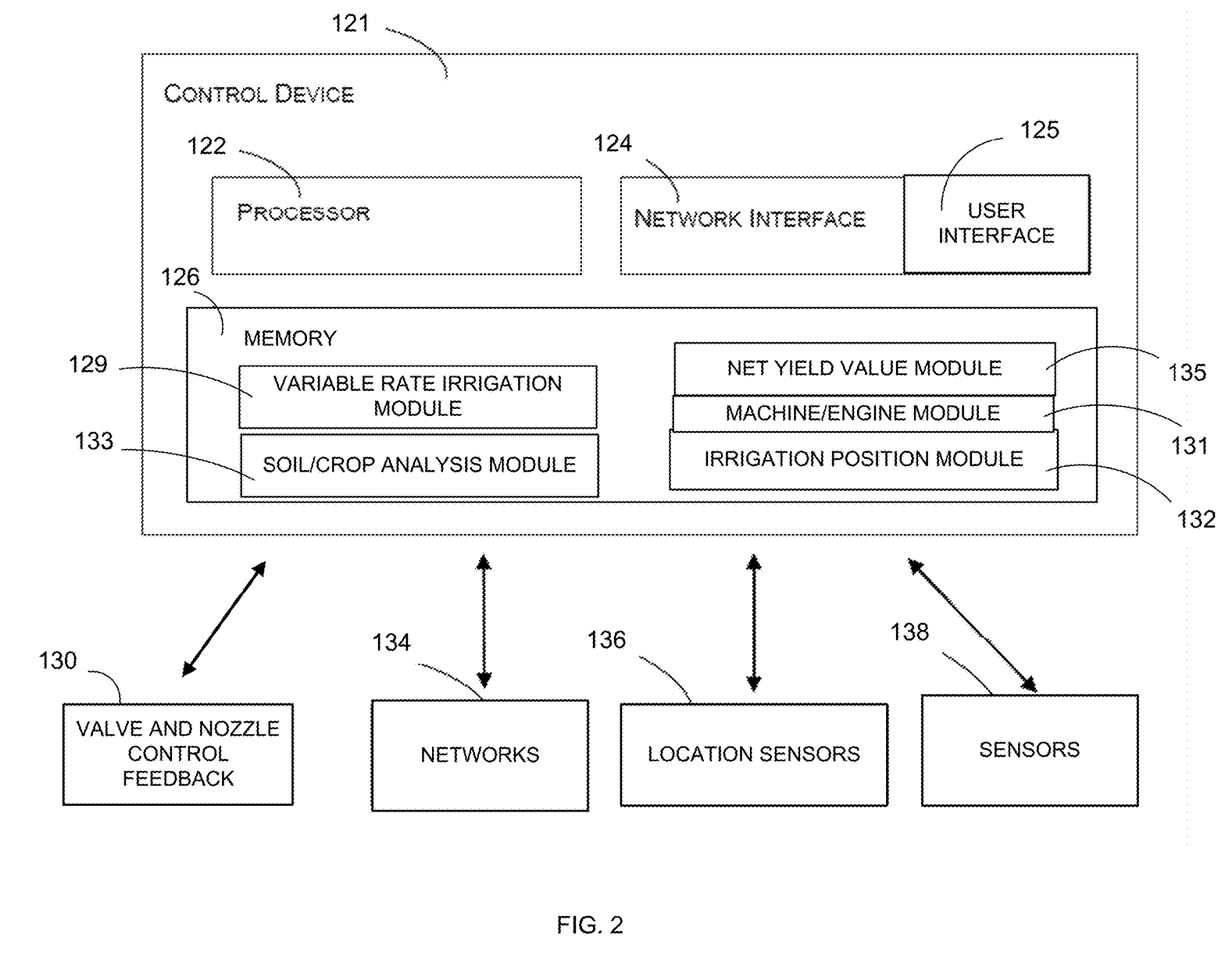
FIG. 2 shows an exemplary control system in accordance with a first preferred embodiment of the present invention.

With reference now to FIG. 2, an exemplary control device 121 which represents functionality to control one or more operational aspects of the irrigation system 100 will now be discussed. As shown, the exemplary control device 121 may include a processor 122, a memory 126 and a network interface 124. The processor 122 may provide processing functionality for the control device 121 and may include any number of processors, micro-controllers, or other processing systems. The processor 122 may execute and the memory 126 may store one or more software programs, as well as other data, to allow the processor 122 and other elements of the control device 121 to implement techniques described herein. The memory 126 may further provide storage for sets of instructions and modules such as, for example, a variable rate irrigation (VRI) module 129 to calculate and control the timing and disbursement of applicants through the irrigation system. The memory 126 may also include an irrigation positioning module 132 or the like to provide mapping and positional data to the system. The memory may also include a soil/crop analysis module 133 for analyzing soil and crop conditions as discussed further below. The memory may also include a machine/engine module 131 for receiving diagnostic and maintenance information via engine sensors, fuel sensors, OBD-II links and the like.

The control device 121 may also include a network interface 124 or the like to enable the control device 121 to communicate with one or more networks 134 through a variety of components both internal and external to the irrigation machine. The control device 121 may also include a user interface 125 which may be a physical screen and/or software accessible remotely. Preferably, the system includes one or more location detection devices 136 (e.g. GPS, LORAN, or the like) to provide location data. The system also preferably includes a valve and nozzle control/feedback system 130 to allow for control of irrigation elements and multiple inputs/outputs to receive data from sensors 138 and monitoring devices as discussed further below.

Preferably, the crop/soil analysis module 133 may combine and analyze image data, in-situ field data, and weather data to determine rates of crop growth and potential crop yields. According to a further preferred embodiment, imaging data may be processed and compared using vegetation indices such as but not limited to: RVI (ratio vegetation index), NDVI (normalized difference vegetation index), SAVI (soil-adjusted vegetation index), MASVI (modified soil-adjusted vegetation index) and RSR (reduced simple ratio index). The crop/soil analysis module 133 will preferably process, combine and evaluate the data collected from all sources, update the water balance and generate irrigation management recommendations. For example, the crop/soil analysis module 133 may receive field specific data of current field conditions and may preferably use the system's analytics to calculate crop water use, crop water stress index, plant production ratio and other indices. In addition, vegetation indices may preferably be calculated as checks against the values calculated from the aerial data and to provide information if cloud cover or other atmospheric interference is present. The crop/soil analysis module 133 and the net yield value module 135 (as discussed further below) may provide data to the VRI module 129 which may autonomously create and execute an irrigation plan which includes custom drive instructions and applicant dispersal rates for a given field as discussed further below. The processor 122 of the present invention may preferably interface with drive control and applicant pressure controls to execute the irrigation plan.

Figure 3:
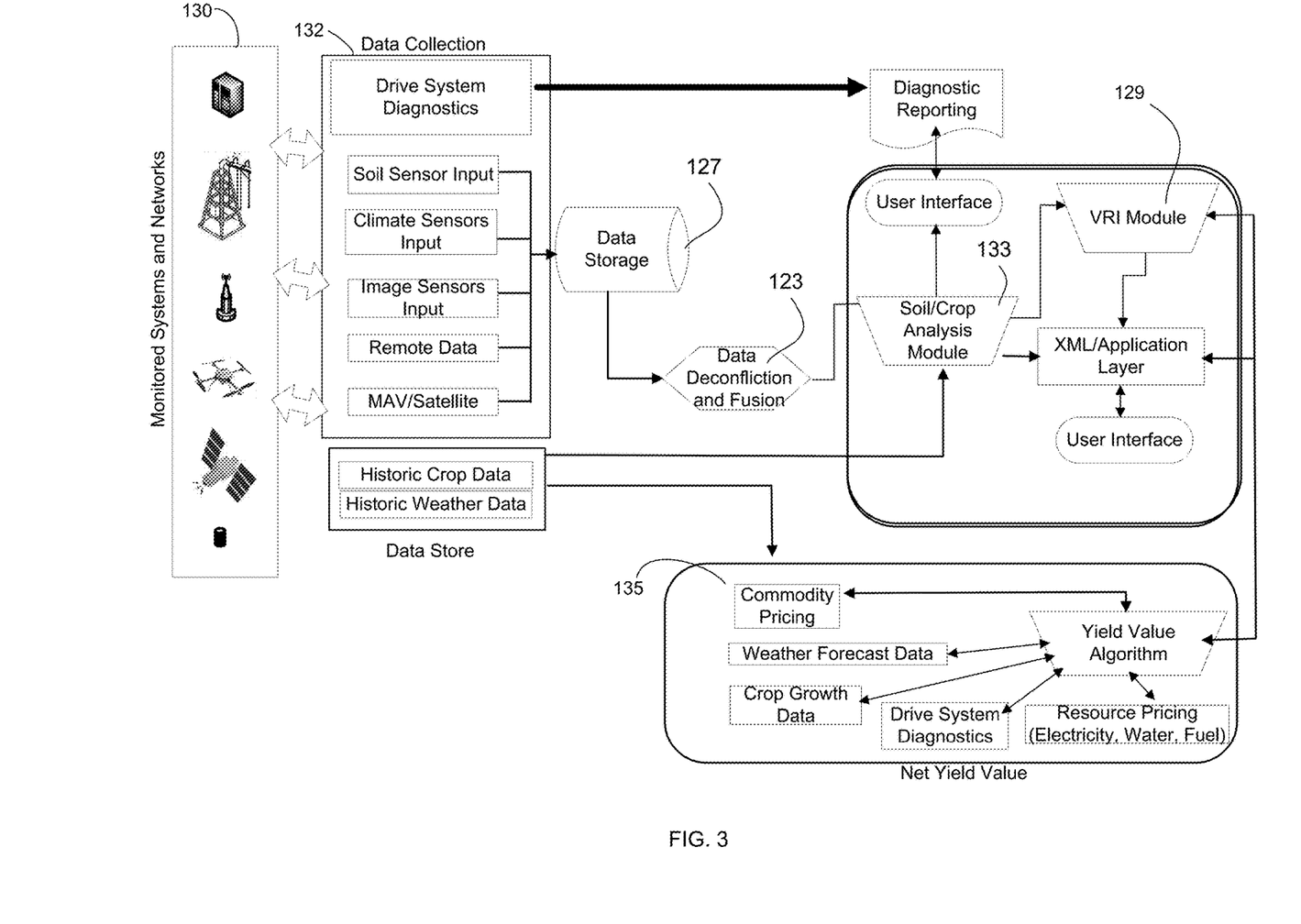
FIG. 3 shows a functional diagram illustrating an exemplary data flow for an exemplary embodiment of the present invention.

With reference now to FIG. 3, a block diagram illustrating aspects of the present invention is shown. As shown, data and sensor systems 130 of the present invention preferably provide input signals to the data collection inputs 132 which are then preferably processed for analysis by the soil/crop analysis module 133. The output from the soil/crop analysis module 133 preferably may be accessed by the VRI module 129. The VRI module 129 may preferably receive data from the net yield value module 135 as discussed further below.

Figure 4:
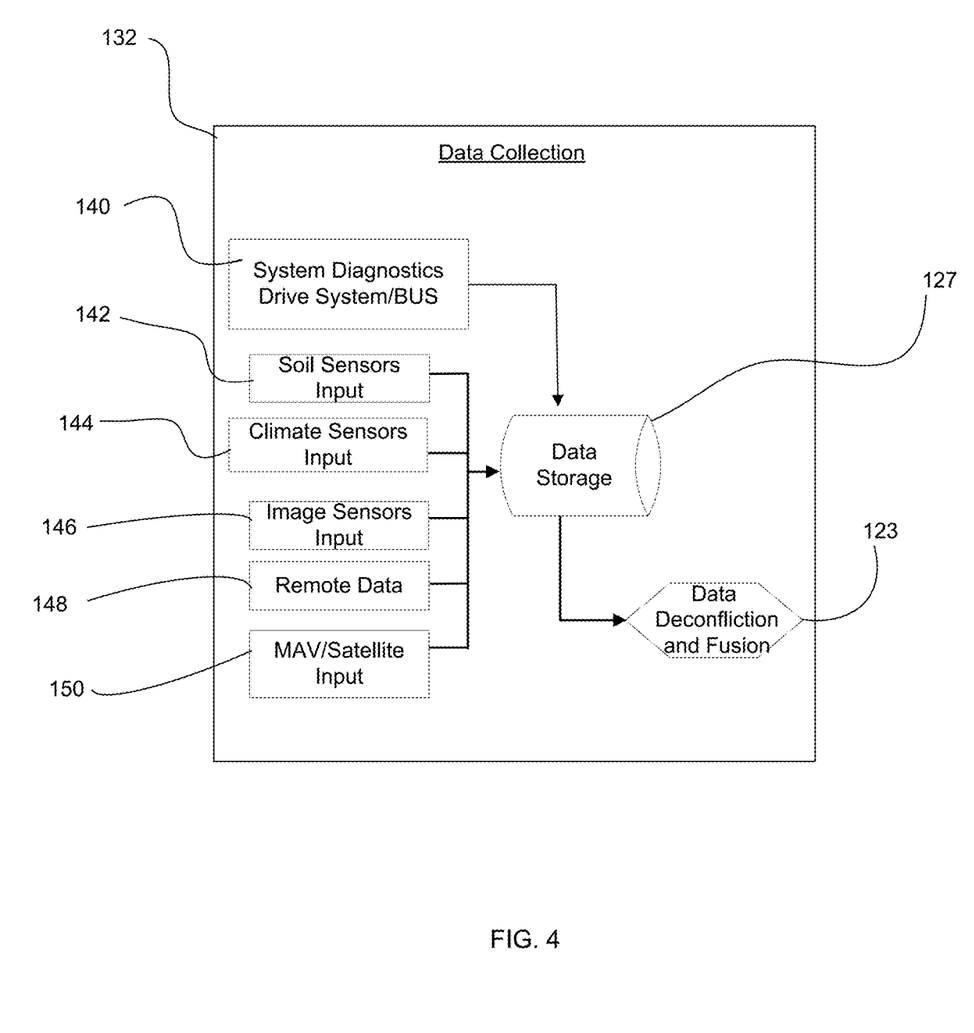
FIG. 4 shows a functional diagram illustrating an exemplary data collection system for the system shown in FIG. 3.
Figure 7:
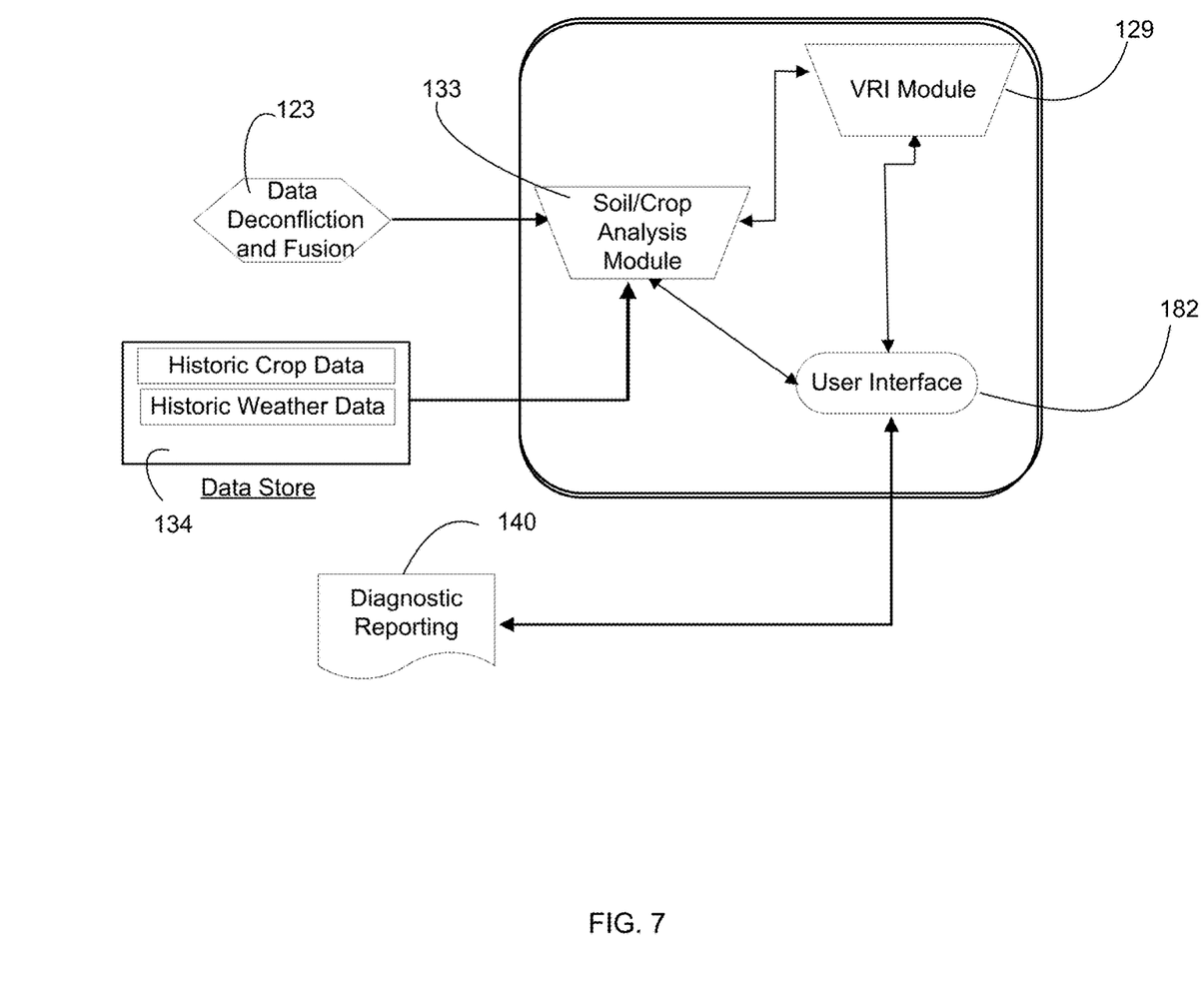
FIG. 7 shows a functional diagram illustrating a user interface and additional modules of the present invention.

With reference now to FIG. 4, the input signals from the sensor systems are preferably received via a set of data collection inputs 132 and thereafter collected and stored in memory/data repository 127. The data sources may include: system diagnostic/BUS data 140; soil sensor inputs 142; climate sensor input 144; image sensor input 146; remote data inputs 148; and remote/MAV/satellite inputs 150. As data from each of the sources of the present invention may differ in format and data structure, the data is preferably transformed into a common format such as XML or other format so that the data can be subsequently mined, modeled and interpreted. According to a preferred embodiment, the data repository 127 preferably provides a common schema and archive for all sensor data in the system as well as for externally provided data along with any required input transformations, extended data dictionaries, and database designs that encompass all inputs. Since the data stored on the data repository 127 is obtained from a variety of tools, the data is preferably further processed to remove duplicated and/or conflicting data. This deconfliction of data is preferably resolved by a combination of data deconfliction methodologies such as rule based and machine learning tools which are provided via a data deconflicting engine 123 or the like. As shown in FIG. 7, once deconflicted, the soil/crop analysis module 133 preferably extracts data from the data store 127 and fuses the data with historic crop/weather data 134 and other inputs. Preferably, data fusion is accomplished using several technologies which may include Dempster/Schaeffer, Bayesian classifiers, neural nets, parallel coordinates, genetic algorithms, AI techniques and other classification schemes. Once fused, the data may preferably be accessed and displayed via a user interface 182 along with VRI module 129 data and diagnostic data 140.

According to preferred embodiments, the user interface 182 may be any type of input device. In embodiments, the user interface 182 may communicate via a wired or wireless communication connection including, but not limited to, a Peripheral Component Interconnect Express (PCie) connection, an ethernet connection, a fiber optic connection, a USB connection or the like. The user interface may preferably include a web accessible link which provides data via web-pages which include graphical user interfaces (GUIs) as discussed further below.

Figure 5:
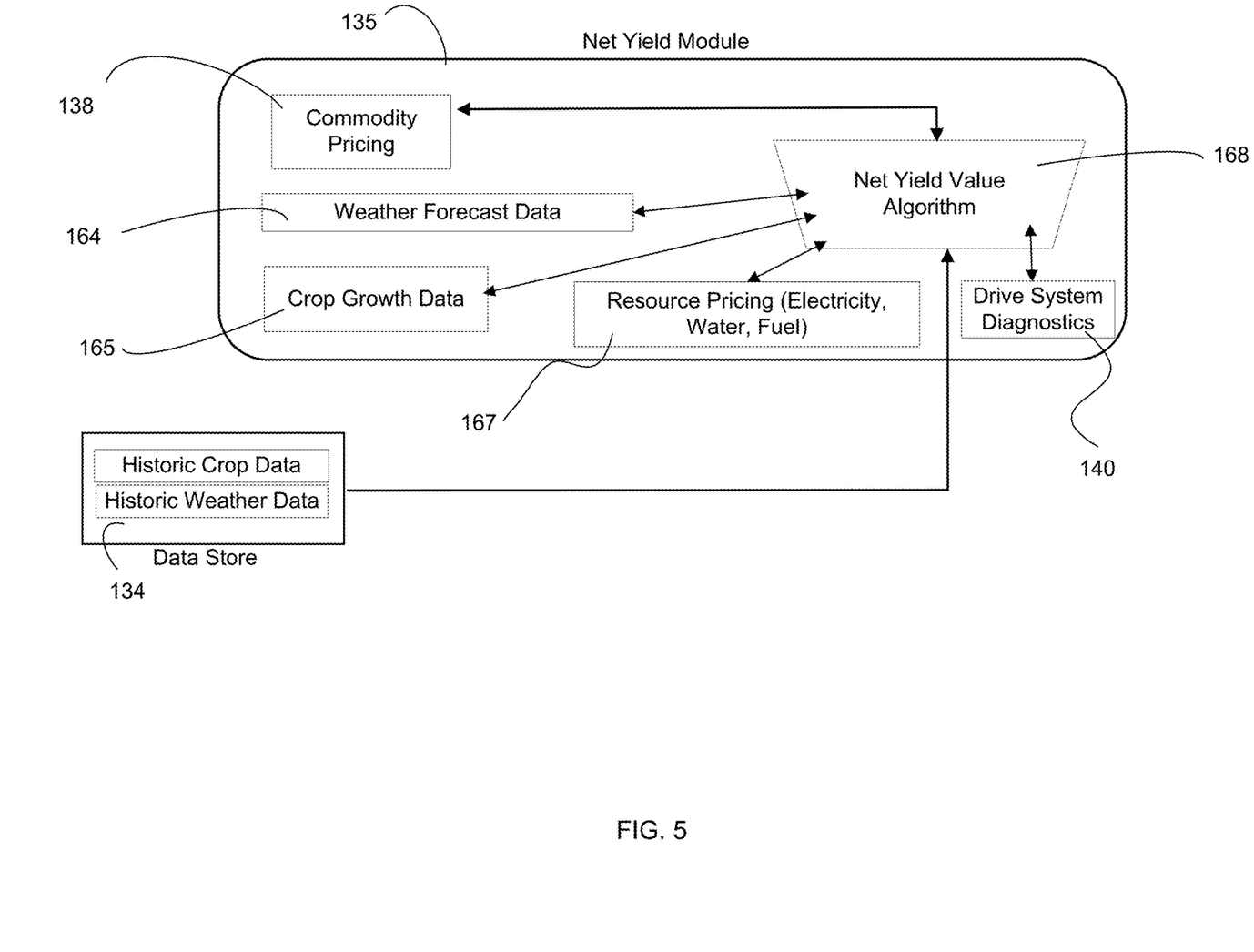
FIG. 5 shows a functional diagram illustrating an exemplary net yield module for the system shown in FIG. 3.
Figure 6:
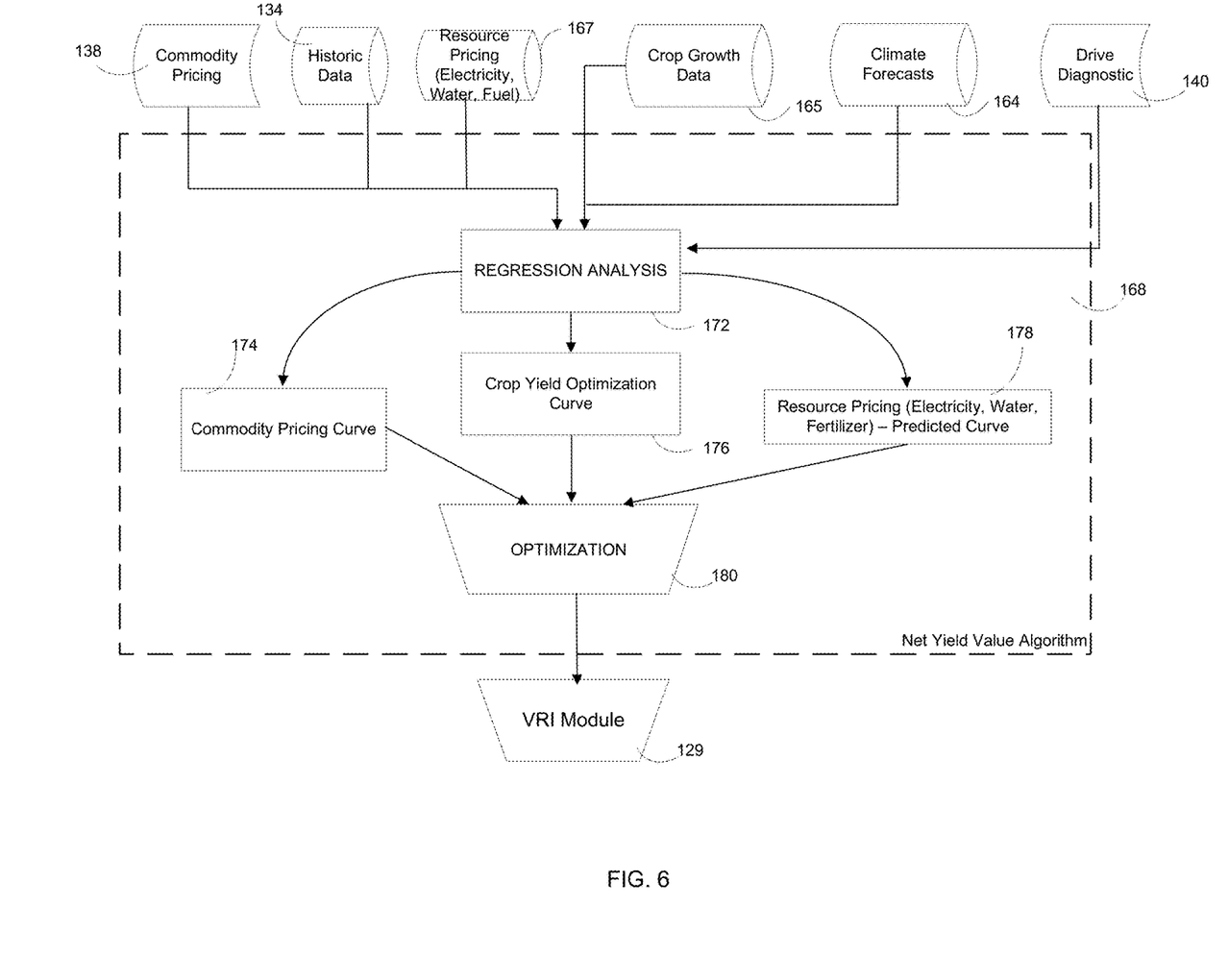
FIG. 6 shows a functional diagram illustrating a net production algorithm.

With reference now to FIGS. 5-6, the system may further include a net yield value module 135 which preferably operates to collect and analyze data related to crop health, crop growth rates, potential crop yields and operational costs. Example input variables may include: commodity pricing 138; weather data 164; crop growth data 165; resource pricing data 167; drive system data 140; and historic data 134. Preferably, the combination and analysis of data is continually processed and updated.

As shown in FIG. 6, the net yield value module 135 preferably analyzes the collected data using a net yield value algorithm 168 which includes several processing steps. According to a preferred embodiment, the net yield value algorithm 168 preferably processes the received data using regression analysis 172 to create models of future values for selected variables. According to a preferred embodiment, the models may include one or more commodity pricing curves 174, crop yield optimization curves 176 and resource pricing curves 178. These respective models preferably represent a projected set of future values for each variable over the course of a given growing season. Thereafter, the net yield value algorithm 168 preferably further applies mathematical optimization modeling 180 to the modeled curves to determine the optimal target crop yields, irrigation prescriptions and harvest scheduling. The optimization method used may include any mathematical optimization method without limitation. According to a preferred embodiment, artificial intelligence techniques may preferably be used such as evolutional algorithms or the like. The optimized target crop yields, irrigation prescriptions and harvest scheduling are then preferably transmitted or accessed by the VRI module 129 for use in developing a target irrigation prescription for a given area.

As shown in FIG. 7, data output from the soil/crop analysis module 133, the VRI module 129, and the vehicle diagnostic systems 140 are each accessible via a user interface 182. The output data is preferably modeled and made available for presentation in a dashboard display that is focused on graphical and mathematical visualization of the data. The user interface 182 preferably provides an interface through which data generated by the present invention is transformed into predefined or user selectable visual representations as discussed further below.

Figure 8:
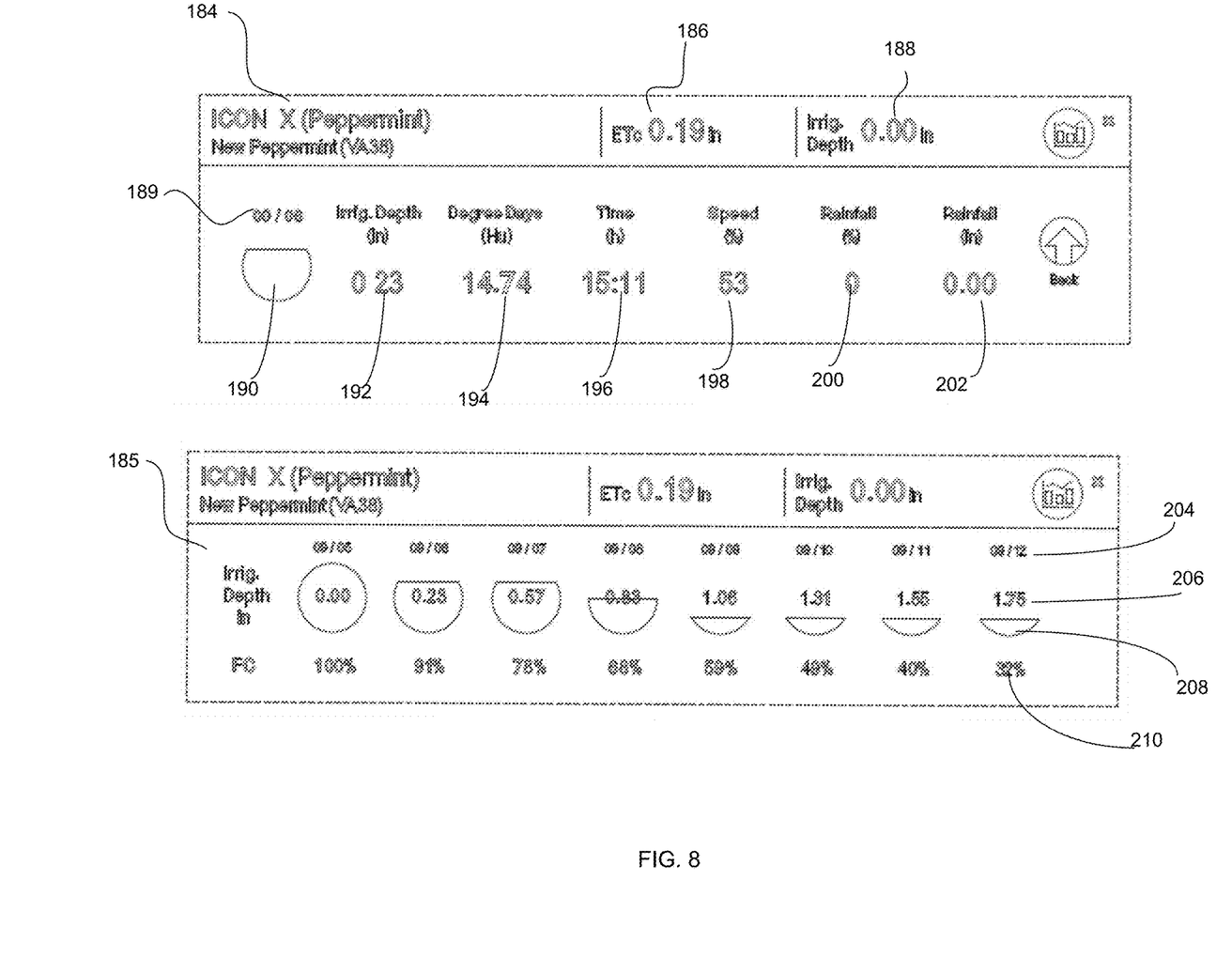
FIG. 8 shows an exemplary interactive display in accordance with aspects of the present invention.

Referring now to FIG. 8, the system of the present invention preferably processes requests by extracting data, transforming it and displaying recommended and forecasted data through the requester's web browser. FIG. 8 illustrates an exemplary interactive display incorporating a number of graphical user interfaces (GUIs) in accordance with the present invention. As shown, a first GUI display 184 includes a daily irrigation recommendation along with supporting information for the irrigation recommendation for given dates 189 (e.g. September 2006). In the example display 184, an example crop of "Peppermint" is shown along with an initial crop evapotranspiration rate (ETo) 186 and an irrigation depth 188 for the current date. An irrigation recommendation 192 is provided (e.g. irrigation depth in inches) along with a representative shape 190 indicating the percentage of field capacity remaining as discussed further below. Additional supporting information shown includes: degree days 194; current time 196; recommended irrigation speed 198; rainfall forecast 200 and recorded rainfall 202.

As shown in a second GUI display 185, present invention may display irrigation recommendations for a range of future dates 204 (e.g. September 2006-September 2012). As shown, the display may include a daily irrigation recommendation 206 (e.g. irrigation depth in inches) along with a representative shape 208 indicating the percentage of field capacity remaining. As shown, the daily irrigation recommendation 206 may be superimposed over the representative shape 208 to provide an efficient view of the combined information. The field capacity 210 may also be represented numerically.

As show in each GUI display 184, 185, the irrigation recommendation may be printed inside or above a representative shape 190, 208 indicating the field moisture status for each day of the forecast. Preferably, the shapes 190, 208 may be based on a circle that changes from a full circle to a crescent depending on the soil moisture status. For example, less soil moisture (more irrigation required) may preferably be represented by a less complete circle shape for that day's irrigation recommendation. According to further preferred embodiments, the date assigned 189, 204 to the recommendation may be provided above each irrigation recommendation. Below the irrigation recommendation, the printed soil moisture status may be numerically reported as a percent of field capacity (% FC) 210. Preferably, the irrigation forecast for any day can be expanded to display relevant crop and irrigation data by clicking on the irrigation recommendation or the shape(s) 190, 208. The shape(s) 190, 208 of the present invention may be colored and may also change in color, shade and/or intensity to indicate different levels of soil moisture.

Figure 9:
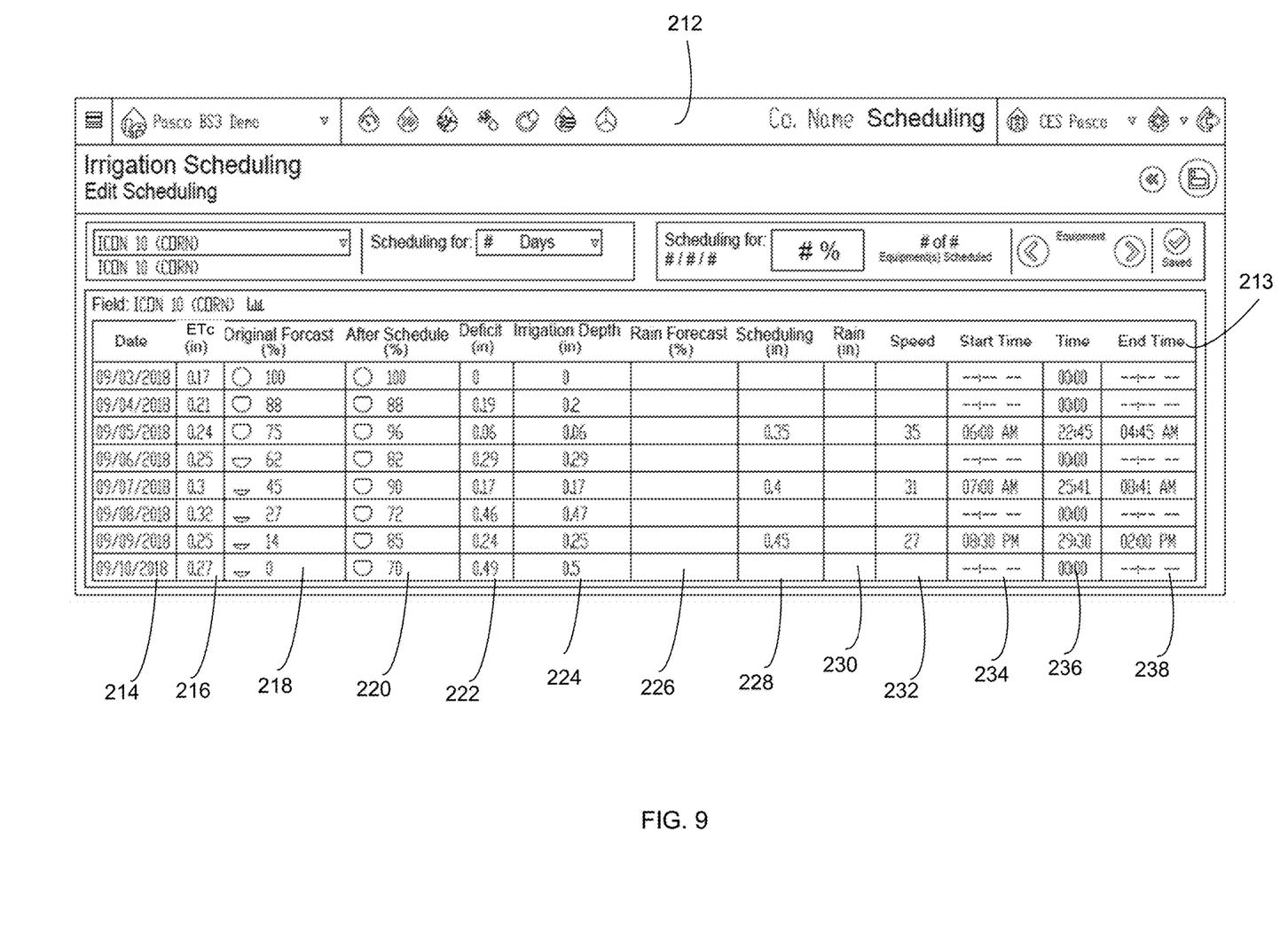
FIG. 9 shows a second interactive display incorporating further aspects of the present invention.

With reference to FIG. 9, an exemplary irrigation recommendation display 212 may include a chart 213 having rows of information for each day within a selected range. The chart 213 may include columns listing information for each date 214 including: crop evapotranspiration rate (ETc) 216; original field capacity 216; after irrigation field capacity 220; deficit 222; irrigation depth 224; rainfall forecast 200; scheduled irrigation amount 228; recorded rainfall 230; irrigation speed 232; irrigation start time 234; current time 236; and irrigation end time 238. The chart may further include one or more circle based shapes representing soil moisture status as discussed in detail above.

According to preferred embodiments, the user interface may preferably allow the user to manually input daily irrigation amounts. The system may also preferably receive and automatically input daily rainfall amounts received. In both cases, the displays of the present invention may preferably automatically update and display updated irrigation forecast data for a user-selected number of days ahead. Accordingly, the user may propose irrigation for a selected number of days ahead and visually see a comparison of the original irrigation forecast to the scheduled irrigation forecast. Further, the system may preferably compute and update the soil moisture deficit for each day and the irrigation required to fill the deficit each day of the selected period.

The scope of the present invention should be determined not by the embodiments illustrated, but by the appended claims and their legal equivalents.

The invention claimed is:

1. A method for creating irrigation scheduling data for a water delivery system for a first crop, wherein the water delivery system is comprised of a primary conduit and a plurality of sprayers, the method comprising:
    producing a first set of sensor data; wherein the first set of sensor data comprises image data, soil data, crop data and weather data;
    analyzing the first set of sensor data to produce a second set of yield calculation data; wherein the second set of yield calculation data comprises a set of prospective crop yields for a plurality of prospective harvesting dates;
    receiving and analyzing the first set of sensor data and the second set of yield calculation data;
    receiving a third set of yield value data comprising commodity pricing, weather forecast data and operating cost data for the first crop;
    calculating a daily operating cost for the growth and maintenance of the first crop; wherein the daily operating cost are calculated based at least in part on the weather forecast data;
    calculating a plurality of daily net yield values based at least in part on the second set of yield calculation data and the calculated daily operating cost for the first crop;
    producing updated sensor data;
    producing updated yield calculation data based on the updated sensor data; and
    calculating and displaying a fourth irrigation recommendation based at least in part on the plurality of daily net yield values;
    displaying the fourth irrigation recommendation with a representative shape indicating a field moisture status; wherein the representative shape is comprised of a circle which changes from a full circle to a crescent-shaped percentage of the full circle based on the field moisture status.

2. The method of claim 1, wherein the method further comprises the step of: modifying the fourth irrigation recommendation based on user inputted information.

3. The method of claim 2, wherein the method further comprises the step of: creating and executing an irrigation plan which includes custom drive instructions and applicant dispersal rates for the first crop.

4. The method of claim 3, wherein the method further comprises the step of: interfacing with a drive control unit to execute the irrigation plan.

5. The method of claim 4, wherein the method further comprises the step of: interfacing with a water pressure control unit to execute the irrigation plan.

6. The method of claim 5, wherein the method further comprises the step of: calculating a fifth daily net yield value based on a commodity pricing curve.

7. The method of claim 6, wherein the method further comprises the step of: calculating a sixth daily net yield value based on a resource pricing curve.

8. The method of claim 7, wherein the method further comprises the step of: calculating the daily operating cost based at least in part on a plurality of collected system data.

9. The method of claim 8, wherein the plurality of collected system data comprise diagnostic and maintenance information received from at least one engine sensor and at least one fuel sensor.

10. The method of claim 9, wherein the method further comprises the step of: transmitting a seventh harvest schedule and calculating an eighth VRI prescription based at least in part on the seventh harvest schedule.

11. The method of claim 10, wherein the method further comprises the step of: analyzing image data using a vegetation index.

12. The method of claim 11, wherein the vegetation index is selected from the group of vegetation indices comprising: RVI (ratio vegetation index), NDVI (normalized difference vegetation index), SAVI (soil-adjusted vegetation index), MASVI (modified soil-adjusted vegetation index) and RSR (reduced simple ratio index).

* * * * *